March 14, 1961     A. E. LEISENRING     2,974,385
MOLDS FOR CONCRETE TEST SAMPLES
Filed Aug. 31, 1959
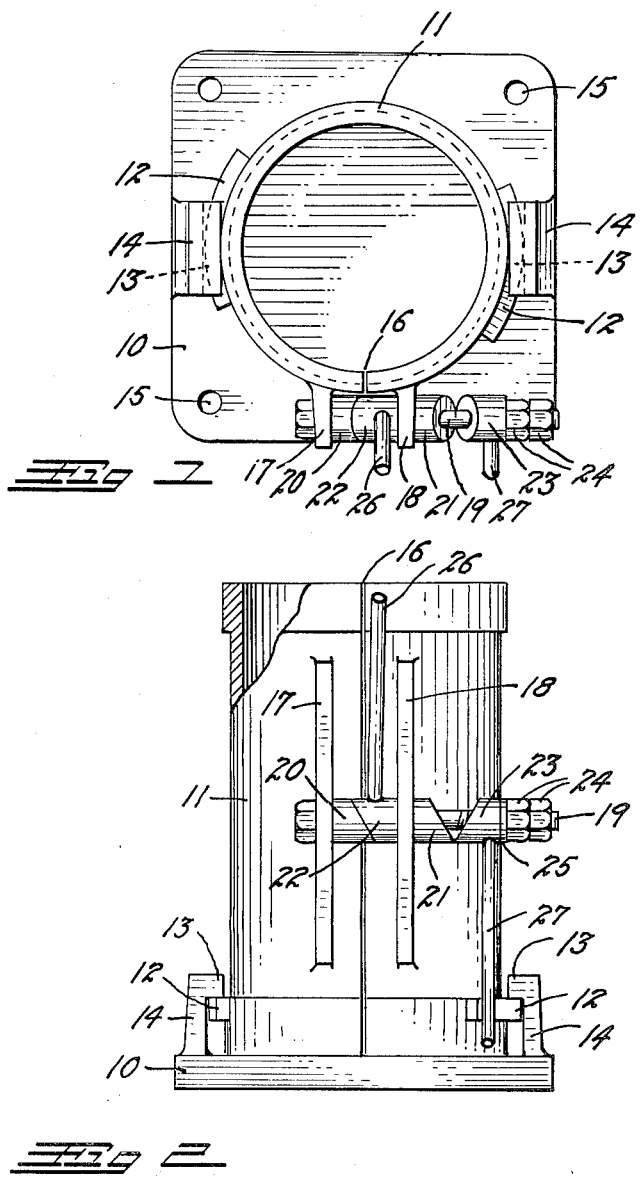
INVENTOR.
ARTHUR E. LEISENRING
BY
ATTORNEY

2,974,385
MOLDS FOR CONCRETE TEST SAMPLES

Arthur E. Leisenring, 1735 Blake St., Denver 2, Colo.

Filed Aug. 31, 1959, Ser. No. 837,268

2 Claims. (Cl. 25—118)

This invention relates to a mold for producing test samples of concrete for use in a concrete testing machine. Machines of this character test the compressive strength of various mixtures of portland, cement, sand and gravel by applying measured compression pressures to cured concrete cylinders or test samples of accurate dimensions.

The principal object of this invention is to provide a highly efficient, accurate, and easily used mold for quickly and efficiently producing accurate test samples for use in concrete compression testing machines.

Attempts have been made to form test samples from solid cylindrical molds, but it has been found exceedingly difficult to remove the cured samples from such a mold. Other attempts have been made to mold the samples in hinged molds. The latter attempts, however, have not been satisfactory due to the difficulty of holding the molds closed while vibrating the concrete and to the difficulty in obtaining accurately dimensioned samples.

Another object of the invention is to so construct the mold that it can be quickly and easily closed for receipt of the mixture, which can be quickly and easily opened to readily discharge an accurate, cured test sample therefrom.

It is desirable that such molds be rugged, accurate, inexpensive, lightweight and water-tight since the loss of water from a test sample will carry cement from the aggregate and effect the accuracy of the tests thereon.

A further object is to provide a sample mold of this character which will be automatically water-tight.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved concrete test sample mold; and

Fig. 2 is a side elevational view thereof partially broken away.

The improved test sample mold comprises a base plate 10, preferably formed from cast aluminum, the upper surface of the base plate 10 is accurately machined to a perfectly smooth plane, and a molding cylinder 11, also preferably of cast aluminum, the lower surface of which is similarly accurately machined to form a water-tight joint with the machined upper surface of a base plate 10 when clamped into position thereon. The base plate 10 is provided with screw openings 15 through which suitable screws may be inserted for mounting the plate upon a work bench.

The molding cylinder 11 is clamped to the base plate 10 by means of two oppositely positioned inclined bayonet cams 12 which engage beneath hook lips 13 formed on oppositely positioned cam lugs 14 which are cast integrally with the base plate 10. Thus, it can be seen that a slight twist in one direction will securely clamp the molding cylinder 11 tightly against the base plate 10 and a similar slight twist in the opposite direction will instantly release the cylinder from the base plate. The accurate machining between the cylinder and the base plate and the clamping action of the bayonet cams 12 produces a water-tight joint between the base plate and the cylinder.

One side of the molding cylinder 11 is accurately split longitudinally and vertically, as shown at 16, the edges of the split 16 are accurately machined so that when they are drawn together and into contact, they will form a water-tight joint in the side of the cylinder. Stiffening ribs 17 and 18 cast on the cylinder 11 adjacent and parallel to the edges of the split 16. The ribs 17 and 18 form stiffeners or straighteners for the molding cylinder 11 along the edges of the split to insure that these edges will remain perfectly true so as to make a perfect contact throughout their entire lengths.

The two sides of the split 16 may be drawn together into sealing contact by means of a draw bolt 19 which passes horizontally through the ribs 17 and 18 substantially at the vertical middle of the molding cylinder 11. A first, fixed cylindrical beveled cam 20 surrounds the bolt 19 in fixed relation to the inside face of the rib 17 and a second similar, fixed cylindrical beveled cam 21 surrounds the bolt 19 in fixed relation to the outside face of the second rib 18. The fixed cams 20 and 21 are preferably positioned with their "high" points at the bottom. A first rotatable cylindrical beveled cam 22 surrounds the bolt 19 between the fixed cam 20 and the inside face of the second rib and a second rotatable, cylindrical beveled cam 23 surrounds the bolt 19 between the fixed cam 21 and preset jam nuts 24 mounted on the threaded extremity of the bolt 19. A thrust washer 25 is positioned on the bolt 19 between the nuts 24 and the second rib 18.

A first hand lever 26 is mounted in and projects radially from the first rotatable cam 22 and a second hand lever 27 is similarly mounted in the second rotatable cam 23. The hand levers project from the "high" points of their respective cams.

Thus, it can be seen that if the hand levers are positioned upwardly, the beveled faces of the contacting cams will lie against each other so that the distance between the jam nuts 24 and the key 18 will be minimum. If, however, the hand lever 27 be swung downwardly, the beveled faces of the cams 21 and 23 will be misaligned to force the nuts 24 outwardly to simultaneously pull the key 17 and push the key 18 to close the split 16. If the hand lever 27 be swung upwardly and the hand lever 26 be swung downwardly, the cams 20 and 22 will be forced apart to open the split 16.

It is believed that the use of the improved sample mold will be apparent from the above. Briefly, with the mold in the position as shown on the drawing, the split 16 is completely closed and the cylinder is tightly seated on the base plate.

The cylinder is now filled with the mixture to be tested and struck off level at the top. It is now allowed to set to cure the concrete sample. After curing, the cylinder is rotated to release it from the base plate. The hand lever 27 is swung upwardly and the hand lever 26 is swung downwardly to expand the cylinder and release the cured concrete cylindrical sample for test purposes.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. Means for opening and closing a longitudinal split in one side of a cylinder comprising: a vertical flange formed on and projecting from said cylinder at each side of and parallel to said split; a bolt passing horizontally through both flanges; a fixed beveled cam surrounding said bolt adjacent one flange; a rotatably beveled cam surrounding said bolt adjacent the other flange, said cams being positioned between said flanges and having their beveled faces facing each other so that rotation of said rotatable cam will urge said flanges apart to open said split; means for rotating said rotatable cam; and means for forcing said flanges toward each other to close said split when desired.

2. Means for closing and opening a longitudinal split as described in claim 1 in which the means for forcing said flanges toward each other to close said split comprises: a head on said bolt contacting the outside of said one flange; a nut threaded on said bolt outside said other flange; a second fixed beveled cam on said bolt; a second rotatable beveled cam on said bolt, said latter cams being positioned on said bolt between said other flange and said nut and both having beveled faces facing each other so that rotation of said second rotatable cam will urge said flanges toward each other; and means for rotating said second rotatable cam.

References Cited in the file of this patent

UNITED STATES PATENTS

| | | |
|---|---|---|
| 270,704 | Stowell | Jan. 16, 1883 |
| 365,176 | Frick | June 21, 1887 |
| 802,666 | Stieler | Oct. 24, 1905 |
| 771,508 | Swink | Oct. 4, 1908 |
| 1,533,341 | Rodler | Apr. 14, 1925 |
| 2,644,220 | Thaulow | July 7, 1953 |
| 2,683,912 | Serrell | July 20, 1954 |